United States Patent [19]

Ashtary

[11] Patent Number: 5,071,545
[45] Date of Patent: Dec. 10, 1991

[54] SHIP-MOUNTED OIL SPILL RECOVERY APPARATUS

[76] Inventor: Parviz N. Ashtary, 6821 Defiance Dr., Huntington Beach, Calif. 92647

[21] Appl. No.: 448,074

[22] Filed: Dec. 8, 1989

[51] Int. Cl.⁵ .......................................... E02B 15/04
[52] U.S. Cl. ................................... 210/153; 210/172; 210/242.3; 210/923; 405/63; 405/66; 114/270
[58] Field of Search ...................... 210/153, 172, 242.3, 210/776, 923, 257.1; 405/63, 66, 68; 114/270

[56] References Cited

U.S. PATENT DOCUMENTS

| Re. 28,966 | 9/1976 | Blockwick | 210/923 |
|---|---|---|---|
| 3,219,190 | 11/1965 | Thune | 210/242.3 |
| 3,221,884 | 12/1965 | Muller | 210/423 |
| 3,529,720 | 9/1970 | Chablaix | 210/242.3 |
| 3,532,219 | 10/1970 | Valdespino | 210/242.3 |
| 3,534,859 | 10/1970 | Amero et al. | 210/242.3 |
| 3,578,171 | 5/1971 | Usher | 210/242.3 |
| 3,615,017 | 10/1971 | Valdespino | 210/242.3 |
| 3,659,713 | 5/1972 | Mueller | 210/776 |
| 3,666,098 | 5/1972 | Garland et al. | 210/776 |
| 3,756,294 | 9/1973 | Rainey | 210/242.3 |
| 3,925,991 | 12/1975 | Poche | 210/923 |
| 3,966,614 | 6/1976 | Ayers | 210/776 |
| 3,983,034 | 9/1976 | Wilson | 210/242.3 |
| 4,006,082 | 2/1977 | Irons | 210/776 |
| 4,052,313 | 10/1977 | Rolls | 210/242.3 |
| 4,073,143 | 2/1978 | Preus | 210/923 |
| 4,209,400 | 6/1980 | Mayes | 210/242.3 |
| 4,388,188 | 6/1983 | Morris | 210/242.3 |
| 4,394,265 | 7/1983 | Van Drimmclen et al. | 210/242.3 |
| 4,399,040 | 8/1983 | Ayers et al. | 210/749 |
| 4,652,173 | 3/1987 | Kallestad | 405/69 |
| 4,960,347 | 10/1990 | Strange | 210/923 |

Primary Examiner—Stanley S. Silverman
Assistant Examiner—Christopher Upton
Attorney, Agent, or Firm—Fulwider, Patton, Lee & Utecht

[57] ABSTRACT

A ship-mounted oil spill recovery apparatus includes a spill barrier in the form of a floating boom that can be placed around an oil-carrying ship or vessel to confine oil discharge in an area immediately surrounding the vessel. The spill barrier is connected to a plurality of support booms located on the vessel which move and maintain the spill barrier. Oil recovery lines are attached to the spill barrier for immediate deployment with the spill barrier. The recovery lines are connected to transporting hoses that extend back to the vessel and are connected to a main on-board oil recovery system. Recovered oil is transported to storage enclosures that float in the body of water away from the ship. Transporting lines connecting the storage enclosures with the recovery system transport the recovered oil from the recovery system to the storage enclosure.

19 Claims, 4 Drawing Sheets

SHIP-MOUNTED OIL SPILL RECOVERY APPARATUS

BACKGROUND OF THE INVENTION

1. Field of the Invention

The present invention relates generally to apparatus or systems for confining and collecting oil spills on a body of water and, more particularly, to a ship-mounted oil recovery apparatus that confines oil discharge in an area immediately surrounding the ship and includes recovery apparatus for collecting and storing recovered oil in auxiliary storage enclosures that can be placed in the water. The storage enclosures can be either towed by the ship or set adrift for later pick up by other recovery vessels. The present invention also relates to the method of containing oil discharge near a ship and recovering the same.

2. Description of the Prior Art

Various methods and apparatus have been developed for the rapid confinement and collection of oil spills on waterways due to the extreme and long-lasting damage that the released oil can inflict on marine life and shorelines. One obvious way of preventing the damage caused by oil spills is through better engineering and construction of oil-carrying ships or vessels to minimize breakage of their oil-storage compartments. However, even the best engineered ships are susceptible to unforeseeable disasters such as collisions with other ships, unchartered reefs and similar objects, and even acts of war which can cause the best-made ship to spew a portion, and sometimes all, of its oil cargo into the water.

Once a ship has been damaged and is discharging oil, the key factor in minimizing environmental damage is through quick containment of the spill to a relatively small area, if possible, for later recovery. For this reason, various confinement apparatus such as floating conduits or booms have been developed which can be transported by helicopter or other ship for deployment around the oil slick until suitable recovery apparatus can be implemented to remove the oil. These floatable boom-type devices usually include a floatable upper portion and lower skirt portion that remains submerged in the water to prevent oil from passing under the device. The device acts in some respects as a floating fence to confine the oil spill within a defined enclosure. While somewhat useful, these devices have several disadvantages discussed below which reduce their effectiveness.

Other ways of dealing with oil spills is through quick recovery along with some measure of containment. In this regard, numerous devices and methods have been designed to recover oil floating on the top surface of the water. For example, specialized skimmers have been placed on smaller, more mobile recovery boats which can move along the water to skim and channel the uppermost oil layer into a collection area where a pump or similar device can transport the oil to holding tanks. Other solutions include flotation suction devices that can be placed in an oil spill and allowed to retrieve a portion of the oil that floats on the water. The recovered oil can be pumped into holding tanks that are located near the suction device.

All of these above-mentioned devices have varying degrees of success in the confinement and recovery of discharged oil. The rate of success, at times, can be totally dependent upon the conditions of the water during the recovery operation. For example, many of the skimming-type recovery boats can not be utilized if wave conditions on the body of the water are too high. Flotation-type suction apparatus also have inherent problems if the water current is too rapid. Still other problems include inaccessibility of the specialized recovery boats in shallow waters or in areas having obstructions floating in, or near, the spill.

These above-mentioned problems are compounded by the fact that these skimmer-type recovery boats and confinement devices usually have to be brought out to the damaged ship after oil discharge begins. In certain situations, the damaged ship can be, and often is, hundreds of miles away from these recovery crafts and confinement devices. In some instances, the oil slick can spread many miles away from the damaged ship before recovery help is received. When this occurs, much more oil is dispersed over a larger area, making recovery more difficult and expensive to accomplish.

As a result of these disadvantages and shortcomings of prior art oil containment and recovery systems and apparatus, it would certainly be advantageous to have a system or apparatus which can be carried on board the ship for quick deployment that allows for quick containment of oil in an area immediately near a damaged ship. Such an apparatus would certainly decrease the possibility of producing long or expansive oil slicks and would reduce some of the problems in recovering the discharged oil. Additionally, such a confinement apparatus would be even more valuable if immediate recovery could also be implemented. Such an apparatus could also reduce the number of recovery boats and other devices that would have to be utilized during the recovery operation. As a result, oil recovery can be done more efficiently and less costly, and more importantly, such an apparatus, in all likelihood, would reduce the possibility that the discharged oil will cause long-standing damage to the environment.

SUMMARY OF THE INVENTION

The present invention rectifies some of the short comings and disadvantages mentioned above that are associated with prior art methods and apparatus for cleaning oil spills. The present invention does so by providing a ship-mounted confinement and recovery apparatus that can be quickly and easily deployed to surround the ship in the event of oil leakage. As a result, confinement and recovery can be achieved with minimal help from additional recovery boats and methods.

In its most general form, the present invention includes barrier or confinement means in the form of a floatable, spill barrier that is stored on the ship and which can be quickly placed around the ship to prevent oil from escaping from an area immediately surrounding the ship. The spill barrier can be placed in the water around the ship by deployment means such as support booms that are located on the deck or hull of the ship. These support booms also maintain the spill barrier in place during the recovery operation.

The invention also includes recovery means that are operative with the spill barrier and deployment means to allow for immediate oil recovery once the spill barrier is in place. In one form of the invention, the recovery means utilizes recovery hoses or lines that are attached to the floating boom and which utilize suction-type devices, usually pumps, located on the ship, which draw the oil back to the ship for temporarily storage in a collection tank. Since oil and water will both be recovered by the apparatus, means for separating the water from the oil can also be utilized. The recovered water can be discharged back into the body of water with the separated oil being stored in auxilliary storage enclosures that are placed in the water away from the ship.

Since most oil-carrying ships do not have empty emergency storage compartments for storing discharged oil, primarily for economic reasons and the fact that oil discharge is a rare occurrence, the present invention utilizes novel, storage enclosures that can be placed in the body of water away from the ship are used to store the recovered oil. One of the benefits of these storage enclosures is that they can be folded to a compact size for storage on the vessel until they are ready for use. Each storage enclosure is capable of floating on the surface of the water and can be filled via transporting hoses on lines that are connected with the recovery system located on the ship. Once the floatable storage enclosure is filled, it can be either towed by the ship or set adrift to allow another recovery boat to pump the recovered oil into its on-board storage tanks.

In one particular form of the present invention, the barrier or containment means is embodied as a spill barrier or floating boom formed from a number of tubular-shaped members that are connected together to form a unitary, encircling barrier. The floating boom can be inflated pneumatically which allows it to float on the water's surface or it can be made with flotation material which provides the necessary bouyancy to maintain the boom above water. The floating boom creates an outer barrier that defines a recovery or confinement area surrounding the ship where the discharged oil should remain until recovery can be attempted. This floating boom is attached to the ends of a number of support booms that are mounted on the deck of the ship and can be quickly deployed in the event of an oil spill.

One form of the recovery system is embodied as a plurality of recovery lines which can be attached to the floating boom and maintained along the surface of the water where the discharged oil should be freely floating. Each recovery line has numerous openings for receiving the discharged oil and are attached to transporting hoses or lines that run from the ship via the expanded support booms. Each transporting hose is connected to the main recovery system located on board the ship. Pumps, or similar apparatus, which create a vacuum or suction, draw the oil through the recovery lines into the transporting hoses to an on-board collection tank. Once the recovered oil is placed in the collection tank, water which is also collected with the discharged oil can be separated and discharged back into the body of water. The collected oil is in turn pumped to the auxiliary storage enclosures that are placed in the water a short distance away from the ship. These storage enclosures serve as floating storage tanks which hold the oil until additional recovery ships can be sent to aid the damaged ship.

One or more of the storage enclosures can be towed from the ship and connected to additional transporting hoses which fill the enclosures. After being filled, the enclosures can either remain in tow with the ship or can be set adrift for recovery by another vessel. One result of utilizing this confinement and recovery apparatus is the fact that the oil spill can be minimized to a much smaller area and immediate recovery measures can be implemented.

Other features and advantages of the present invention will become apparent from the following detailed description, taken in conjunction with the accompanying drawings, which illustrate by way of example, the principles of the invention.

DETAILED DESCRIPTION OF THE PREFERRED EMBODIMENTS

The present invention provides a novel and advantageous oil spill confinement and recovery apparatus that can be mounted onto a deck or hull of an oil-carrying ship or vessel and can be readily deployed in the event that the ship suffers structural damage which causes its stored cargo of oil, or other liquid, to discharge into the water. The present invention helps confine the oil to an area immediately around the ship and includes a recovery system which allows for recovery of the discharged oil and its storage in auxiliary storage tanks or enclosures which are allowed to float on the water at a remote location away from the ship.

Figure 1:
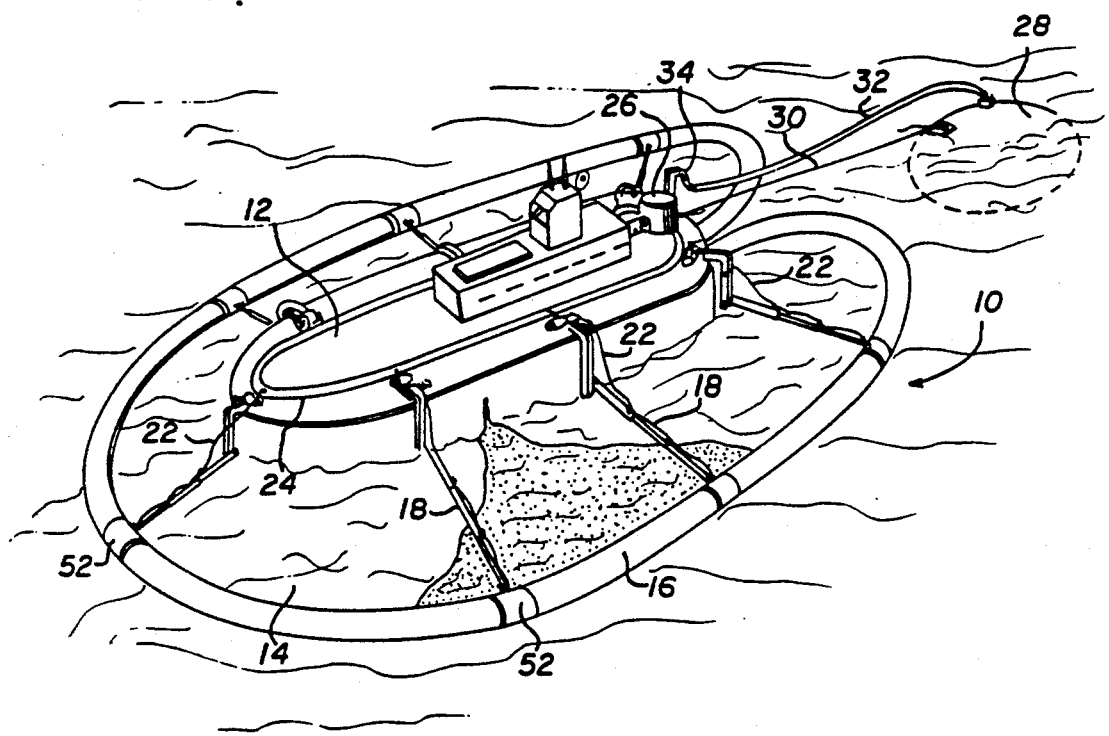
FIG. 1 is a perspective view of an oil-carrying ship of vessel utilizing one embodiment of the present invention which is shown in the deployed position.
Figure 2:
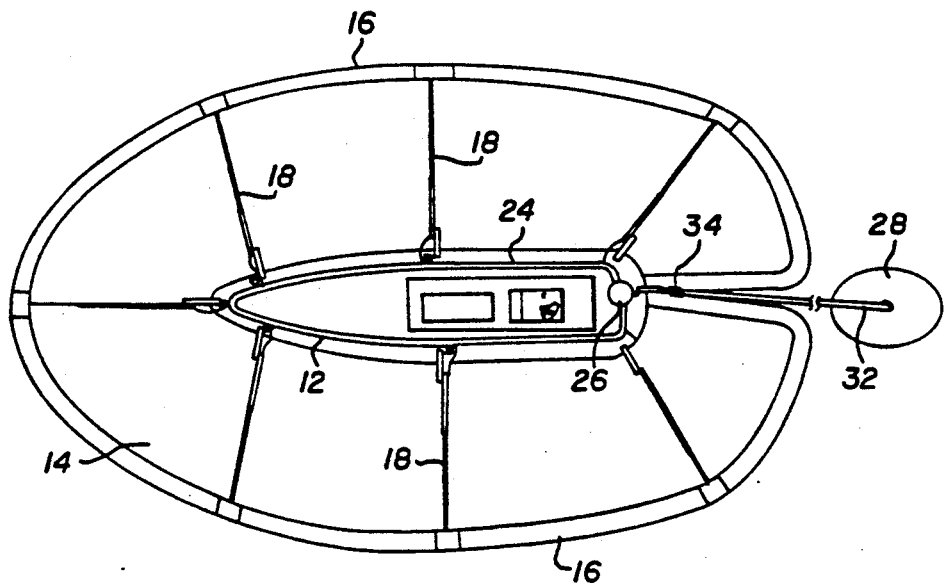
FIG. 2 is a plan view of the ship of FIG. 1 which shows one way of positioning the floating boom around the ship.

With reference to FIG. 1, a ship-mounted oil spill recovery apparatus (10) made in accordance with the present invention is shown in a deployed position on a representative oil-carrying ship (12). Means for confining the oil within a confinement area (14) is shown as an outer floating boom (16) which encircles the ship to create a spill barrier. The floating boom (16) is deployed and maintained in place by a number of support booms (18) which are mounted on the ship (12). These support booms (18) are preferably mounted on the deck of the ship due to the forces that will be exerted on them by the action of the water on the floating boom (16).

The apparatus further includes means for recovering the oil that is collected within the confinement area (14). In the particular form of the invention shown in the drawings, the recovery means include recovery lines (20) which are attached to the floating boom (16)

(See FIGS. 3, 4, and 6) and which in turn are connected to transporting hoses or lines (22) that extend to the ship (12). These transporting hoses (22) are attached to the support booms via clamps (23) to prevent the hoses from dangling in the water during the recovery process. The particular structure of the recovery lines and transporting hoses used in accordance with the particular form of the invention shown in the drawing is discussed at great length below.

Each transporting hose (22) is connected to a main on-board recovery line (24) which is powered by pumps or similar devices which create suction or power to transport the recovered oil into a collection tank (26) that is usually located at the stern of the ship. These pumps (not shown) create a sufficient amount of suction to draw the discharged oil through openings in the recovery lines (see FIG. 6) into the transporting hoses and back onto the ship for temporary storage in the collection tank (26).

During the recovery process, both oil and water will be recovered and placed together in the collection tank (26). Therefore, the collection tank should also include means for separating the water from the oil. The water, once separated from the oil, can then be discharged back into the body of water. The recovered oil, in turn, can be stored in a storage tank or enclosure (28) which is maintained at a remote location away from the ship. This tank or enclosure (28) in one embodiment may be a bladder-like enclosure which can be towed behind the ship via a tow line (30). The enclosure (28) is filled while it floats on the water via a transporting hose (32) that is connected to the main on-bourd recovery system. Once the enclosure (28) is filled, the transporting hose (32) can be disconnected from the main recovery system located on the ship via a connector (34) (FIGS. 1 and 9) and capped to prevent oil discharge from the enclosure (28). Additional enclosures which may be stored on the ship can be towed by the ship and connected by similar transporting hoses for filling.

Figure 3:
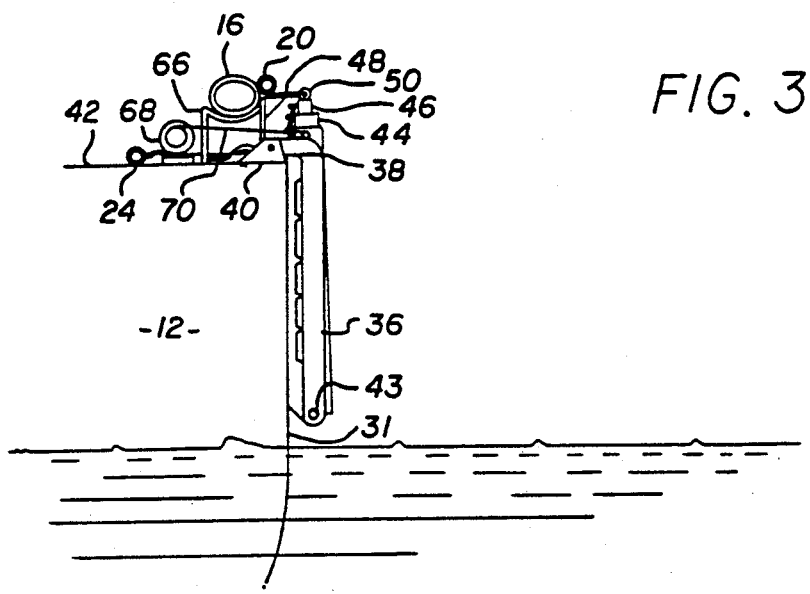
FIG. 3 is a partial cross-sectional, side view of one embodiment of a support boom and floating boom which is mounted in the stowed position on board the ship.
Figure 4:
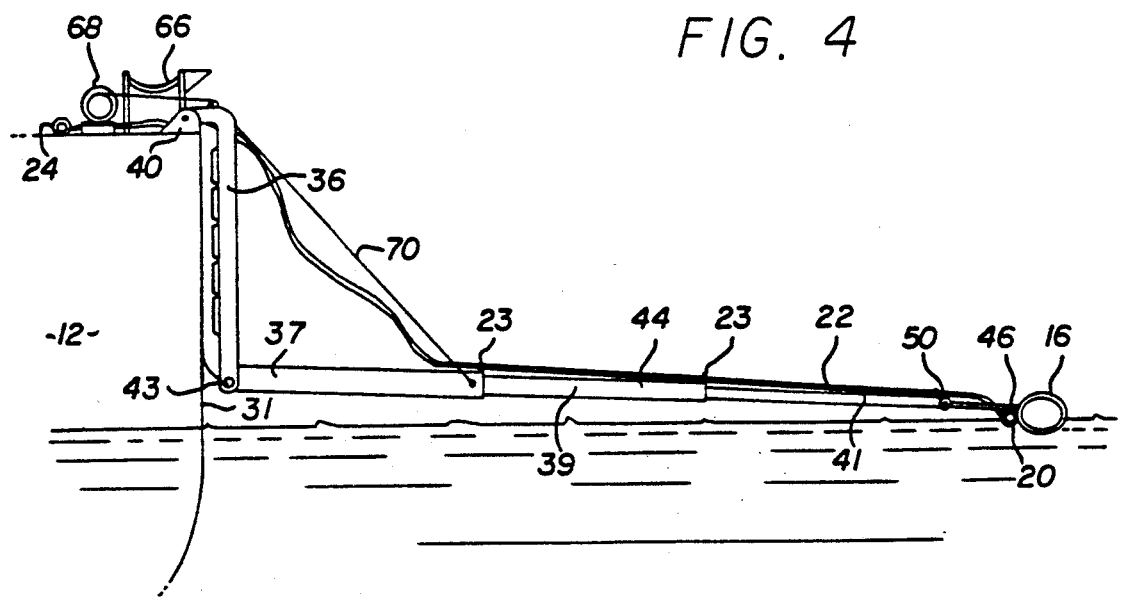
FIG. 4 is a similar side view showing the embodiment shown in FIG. 3 in the deployed position.

Referring now to FIGS. 3 and 4, one particular embodiment of the support boom is illustrated. The support boom (18) shown in these figures is similar to the boom that is depicted in FIG. 1. Referring specifically now to FIG. 3, the support boom (18) is shown in its stowed position as it hangs along the side hull (31) of the ship (12). The support boom (18) includes a stationary support portion (36) which extends down along the side (31) of the ship. One end (38) of the stationary support portion (36) is attached to a ship-mounted yoke (40) or similar mounting bracket which extends near the edge of the deck (42) of the ship. The other end (43) of this stationary support portion is pivotly attached to a telescoping portion (44) which comprises a number of cylindrically shaped, telescoping members 37, 39 and 41, which move relative to one another in a telescoping fashion. This telescopic portion (44) is powered by internal hydraulic or pneumatic piston-cylinders (not shown) which move the individual members 37, 39 and 41 as needed. Cables or other suitable means could also be used to move the telescoping members between their expanded and unexpanded positions.

The floating boom (16) with the oil recovery line (20) is attached to the end (46) of the support boom. (18) In the particular embodiment shown in FIG. 4, the support boom includes an end portion (48) which includes a fitting (50) which allows the support boom and the floating boom to be pivoted upward for placement in the storage position as is shown in FIG. 3.

Figure 6:
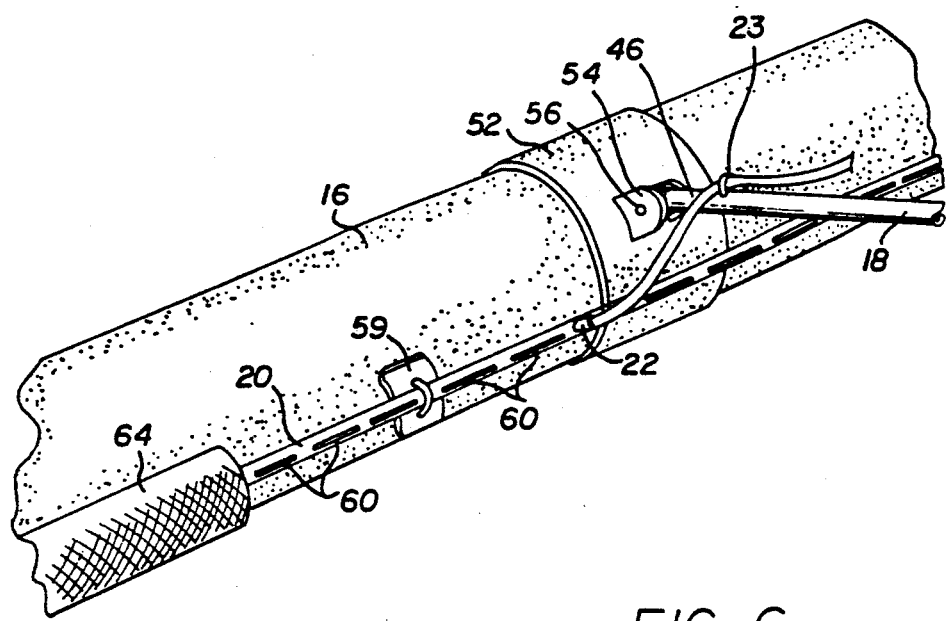
FIG. 6 is a side view showing one way to attach the support boom and recovery line to the floating boom.

One particular way in which to fasten the end (46) of the support boom (18) to the floating boom (16) is shown in FIG. 6. The floating boom includes a sleeve (52) which encircles the pivoting boom (16) and includes a yoke (54) or similar mounting device which allows the free end (46) of the boom to be attached thereto. For instance, a pin (56) or other fastening device can be utilized to maintain the end (46) within the yoke (54). This sleeve (52) can be permanently secured to the floating boom utilizing adhesives or bonding methods to prevent the sleeve (52) from slipping on the floating boom. FIG. 6 just shows one particular way of attaching the support boom to the floating boom. Other means of fastening these portions together can be utilized without detracting from the spirit and scope of the present invention.

FIG. 6 also shows one particular method of attaching the recovery line (20) to the floating boom as well. In this particular embodiment, an eye hook (58) is attached to the surface of the floating boom to maintain the recovery line (20) in place. This eye hook (58) includes a rubber patch (59) or similar material which can be affixed to the surface of the floating boom in the same manner as is done with the sleeve (52). The recovery line also includes numerous openings (60) for recovering the discharged oil. The transporting line (22) can be connected with the recovery line (20) utilizing a standard fitting. The transporting hose (22) can be attached to the support boom (18) via a number of clamps (23) that extend along the length of the support boom.

Since solid debris may be floating along the top surface along with the oil, it is quite possible that the opening (60) of the recovery lines could become clogged with solid debris. One particular way of preventing unwanted debris from entering the openings (60) in the recovery lines is shown in FIG. 6. An encircling mesh-like member (64) with a multiple small opening can be place over the recovery line to prevent large pieces of debris from reaching the openings (60). It should be noted that in FIG. 6, this mesh member (64) is drawn partially removed to better show the recovery line and the means for attaching it to the floating boom.

Referring back now to FIG. 3, the support boom is shown in its stowed position on board the ship. The deck of the ship includes a support structure (66) which is utilized to partially support the floating boom until it is ready for deployment. As was noted above, the end portion (48) of the support boom may be pivotable to allow the floating boom to move onto the support structure during storage. The deck of the ship also includes a motorized winch (68) with cable (70) which is utilized to help move and support the support boom in its deployed position.

Figure 5:
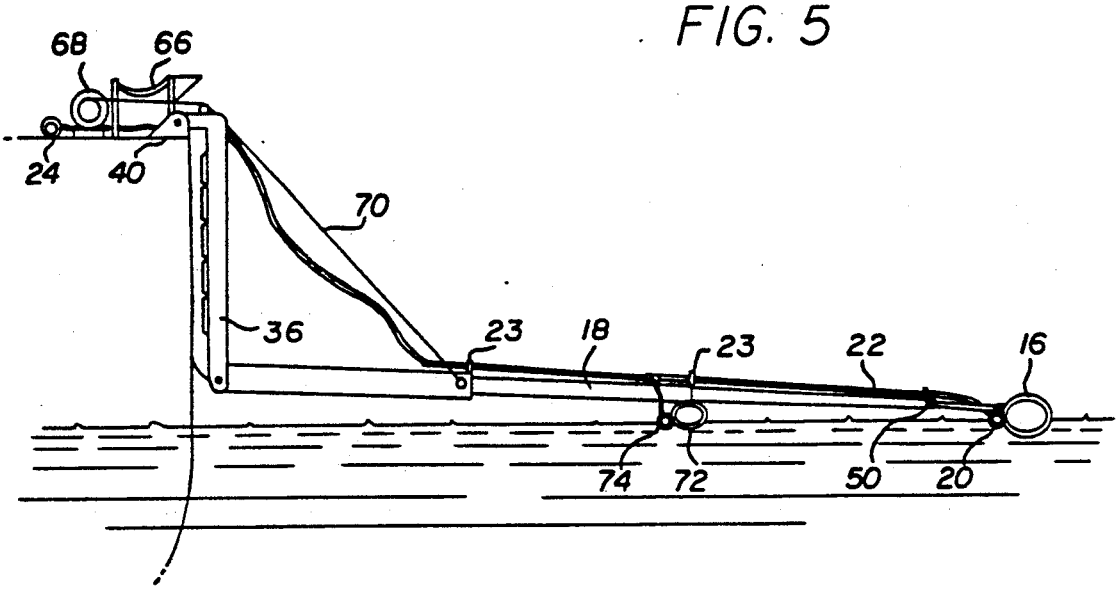
FIG. 5 is an alternative embodiment which shows a secondary floatation device and recovery line which can be attached to the support boom to provide additional oil recovery capability.

Referring now to FIG. 5, the support boom (18) is shown with a secondary flotation device (72) that is attached substantially near the mid-point of the telescopic portion (44). This secondary floatation device (72) can be utilized to help maintain the support boom above the water during deployment. This floatation device (72) need not be an encircling floatation barrier, such as the floating boom (16), but rather, can be a "raft" or other similar device which helps maintain the support boom above the surface of the water.

A secondary oil recovery line (74) can also be attached to the secondary floatation device (72). This recovery line (74) would also be connected with a transport hose (not shown) that can be connected to the oil recovery equipment located on the ship. This secondary recovery line allows for additional oil recovery and lessens the strain on the primary recovery lines located on the floating boom. Additionally, other floatation suction devices (not shown) could also be placed in the oil confinement area (14) to help aid in the recovery of discharged oil.

Figure 7:
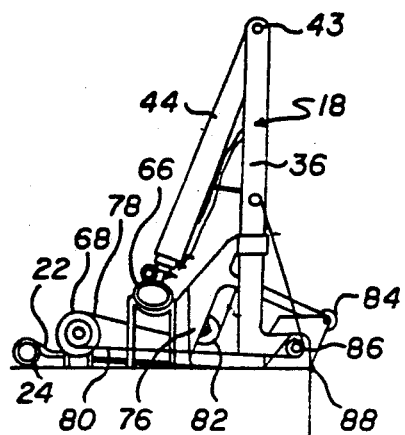
FIG. 7 is a partial cross-sectional side view of an alternative embodiment of a deck-mounted support boom shown in the stowed position.
Figure 8:
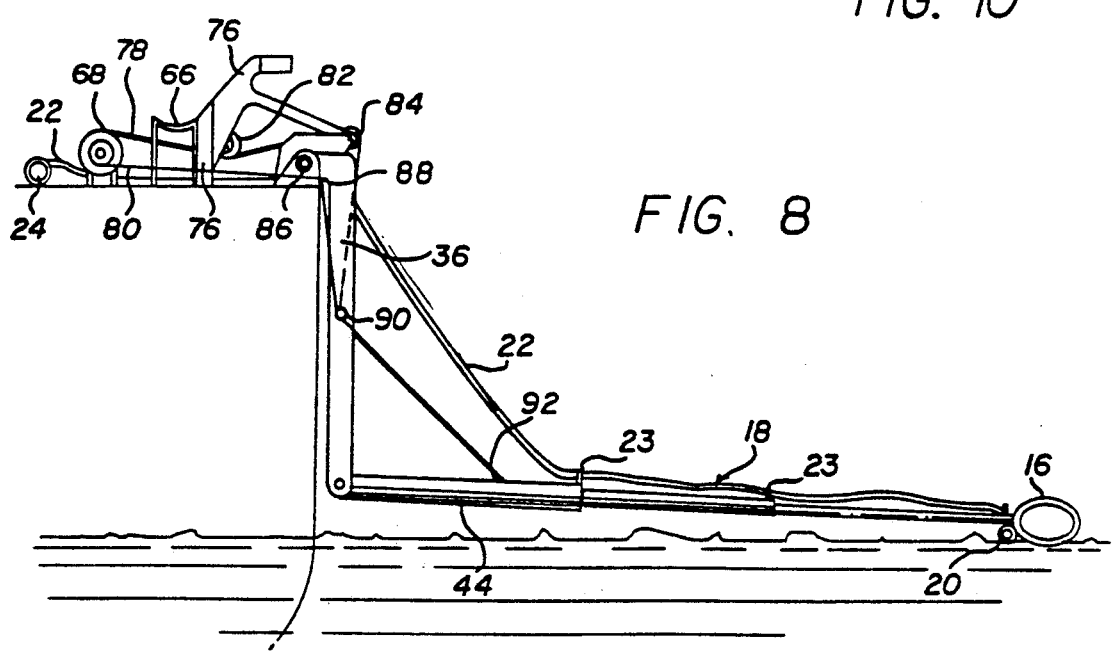
FIG. 8 is a similar side view of the embodiment of FIG. 7 showing the support boom in the deployed position.

FIGS. 7 and 8 show an alternative embodiment of the present invention in which the entire support boom (18) and floating boom (16) can be placed above the deck of the ship during storage. Referring specifically to FIG. 7, the support boom is essentially similar to the support boom shown in FIGS. 3 and 4, except that the stationary support portion (36) is also raised above the deck during storage. This is accomplished by using a mounting on the deck of the ship which allows the support portion (36) to be pivoted upward onto the deck. This support boom includes a similar telescoping portion (44) which allows the flotation boom to be moved out around the ship during deployment (FIG. 8).

One of the benefits of utilizing above-the-deck stowage is the elimination of the possibility that the support booms can become damaged during docking or other similar situations in which the sides of the ship could strike another object. Since this particular embodiment shown in FIGS. 7 and 8 can be stowed on the deck of the ship, additional mechanisms are required in order to raise and lower the support boom when needed.

The support boom (18) utilizes a main frame (76) which is utilized to hold and maintain the support portion (36) of the support boom in the stowed position. This frame (76) is equipped with various rollers which allow cables to be attached to the various portions of the support boom to move the boom between the stowed and deployed positions. A motorized winch (68) is utilized as the primary means that moves the support boom as needed. This winch (68) is connected to a first cable (78) and a second cable (80) which are attached at different locations on the support boom. Alternately, an additional motorized winch may be used and connected to one of the cables. The first cable (78) is basically used to support the main weight of the support boom both during deployment or storage. The secondary cable (80) is primarily used to initiate movement (as is described below) of the support boom from its stationary stowed position into its deployed position.

When in the stowed position, the first cable (78) remains in contact with a first roller (82) which is located near the bottom portion of the frame (78). The end on this first cable is attached to the support portion (36) of the boom and is used to raise and lower the support portion when needed. When the support boom is moved to the deployed position, the first cable (78) contacts a second roller (84) that is located at the outer most end of the frame (78). This second roller (84) basically permits the first cable (78) to run down along the side of the ship to the point when it is attached to the support portion of the boom. This simple arrangement provides most of the raising and lowering power needed to move the support boom between the stowed and deployed position.

The second cable (80) runs from the motorized winch where it contacts a third roller (86) when the support boom is in the stowed position. When the support boom is in the stowed position as shown in FIG. 7, the winch is initially powered to move the second cable (80) to the left which causes the support boom to move away from the ship towards the water. The more the second cable is moved to the left, the more the support boom moves away from the ship. Eventually, the support boom is moved out away from the deck a sufficient amount and gravity comes into play to cause the boom to move down toward the side of the ship. Thereafter, the first cable is utilized to help lower the support position in a smooth motion down along the side of the ship. Once the support portion (36) is in place alongside the ship, the second cable (80) can be further released allowing the telescoping portion (44) of the boom to move downward into its deployed position. When the support boom reaches the deployed position, the second cable (80) contacts a fourth roller (88) which is located near the end of the frame along the edge of the deck to permit the cable (80) to move without binding. A fifth roller (90) found on the support portion of the boom which allows the second cable 80 to be run out to the telescoping portion of the boom where the end (92) can be attached to a hook or similar device. The winch, rollers and the second cable (80) cooperate to raise or lower the telescoping portion (44) from a vertical upright position to the deployed position shown in FIG. 8.

It should be appreciated that the frame (76) should be made with sufficient clearance to allow the respective cables to move freely when the support boom is being moved. The embodiment shown in FIGS. 7 and 8 is merely one way of moving the support boom between the stowed and deployed position and many other different embodiments could also be used without departing from the scope and spirit of the invention.

Figure 9:
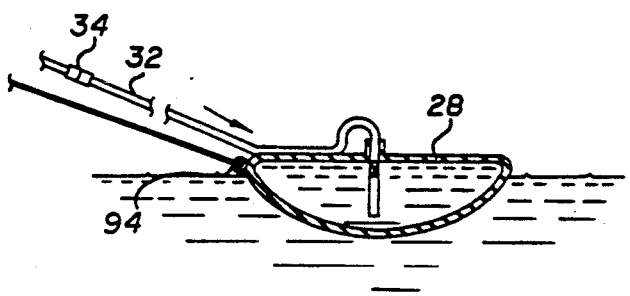
FIG. 9 is a partial cross-sectional view of one embodiment of a bladder-like storage enclosure used to store the recovered oil.

Referring now to FIG. 9, the remote storage enclosure is shown as it would be appear in the water while being towed by the ship. This particular embodiment of the storage enclosure consists primarily of an inflatable bladder which can be stored flat or folded on the ship until it is ready to be utilized. The bladder can be made from rubber or a rubber-like material which can be manufactured to a size and shape which minimizes the chance that the bladder would rupture in rough waters. The bladder can be manufactured from several pieces of materials utilizing lap joints or similar types of joints to create a unitary storage enclosure which is sufficiently tough and is unlikely to rupture during use.

During deployment of the present invention, the storage enclosure can be hooked to a tow-liner and simply thrown into the water where it can be filled via a transporting hose that is attached to the oil-recovery system on the ship. The enclosure may be pre-manufactured with a transporting hose to minimize the steps necessary to implement the present invention. Generally, the tow line is first placed onto an eye (94) which is attached onto the outer surface of the storage enclosure (28). The transporting hose can be hooked up to a discharge line coming from the collection tank and the storage enclosure can then be thrown directly off the ship past the floating boom where it will remain in tow while being filled. Once placed in the water, the recovered oil can be pumped into the enclosure until filled. Since the recovered oil contained within the enclosure will still float on the water, there is virtually no possibility that the enclosure would sink once filled. After the enclosure is filled, the transporting hose can be disconnected via a coupling device (34) and capped to prevent oil from discharging from the enclosure. Additional enclosures can then be utilized to store the recovered oil, thus providing ample storage in which to place the recovered oil.

Figure 10:
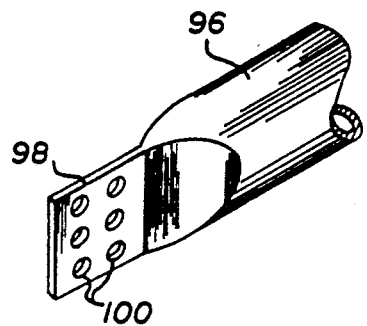
FIG. 10 is a partial perspective view of one end of the tubular member that forms the floating boom.

The support booms utilized in accordance with the present invention can be made from structural metals that can be treated to prevent rusting that is inevitable due to salt water that is encountered by ships. The floating boom can be made from a rubberized material which can be pneumatically inflated. Alternatively, any number of other commercially available floating booms could be utilized without departing from the spirit and scope of the present invention. The recovery system can utilize one or more conventional collection tanks which are also commercially available. The amount of suction and power required to pump the oil through the recovery lines and through transport hoses can vary depending upon the size of the hoses that are being used. The floating boom need not necessarily be one continuous tubular type member, but rather can be a number of individual inflatable members that can be attached together to form a single encircling boom. Referring to FIG. 10, the individual member (96) may include on the end portion (98), formed like a flap, that can be interlocked together with individual members to form a unitary floating boom. Openings (100) are provided for interconnecting the individual members. Alternatively, these end flaps (98) can be used to attach the end of the support boom to the flat portion rather than using the sleeve portion (52) and yoke (54) shown in FIG. 6.

It should be appreciated that only one particular form of an on-board oil recovery system has been described. However, numerous different and varying systems can still be used without departing from the spirit and scope of the present invention. For example, each transporting hose that is attached to the recovery line can be directly connected to a pump or similar device which could pump the oil directly into the collection tank. This system would require many more pumping devices to be utilized, but depending upon the size of the hoses, such a system may be able to apply more suction power for drawing the oil back to the ship. Also, additional recovery devices can be placed in the confinement area in order to recover the discharged oil. The recovery lines need not necessarily be attached to the floating boom as is shown in the drawings. The embodiment shown in the drawing creates a convenient apparatus which readily deploys the recovery system at the same time that the spill barrier is being positioned around the ship.

Additionally, the recovery line which is attached to the floating boom need not be one continuous line. The recovery line can be a short piece of hose that is attached to our individual transporting hose and the floating boom. The number of recovery lines and transporting hoses can vary depending upon the drawing power that is produced by the on-board recovery system. For example, many more transporting hoses can be run from the ship to the floating boom via the support booms in order to increase the drawing power of the recovery system. Many different embodiments can thus be utilized without departing from the scope of the invention.

From the above, it may be seen that the present invention represents a relatively simple and reliable solution to the problems generally associated with prior art oil collection and recovery systems. The present invention is ship-mounted to allow for quick deployment in the event that the ship begins to discharge oil. As a result, there should be minimal loss of oil and danger to the surrounding environment.

While particular forms of the invention have been illustrated and described, it will be apparent to those skilled in the art that various modifications can be made without departing from the spirit and scope of the invention. Accordingly, it is not intended that the invention be limited except by the appended claims.

What is claimed is:

1. An apparatus for confining and recovering oil and other floatable liquid pollutants discharging into a body of water from an oil-carrying vessel comprising:
   barrier means for confining the discharged oil around the vessel;
   means for moving and maintaining said barrier means relative to the vessel, said moving and maintaining means comprising a plurality of support booms mounted to the vessel and attached to said barrier means, wherein each of said support booms includes a telescoping portion moveable between an expanded and unexpanded position;
   means for recovering at least a portion of the discharged oil in the water; and
   means for storing oil recovered by said recovery means.

2. The apparatus as defined in claim 1 wherein:
   said storage means are remotely located from the vessel and float on the water; and
   said recovery means further includes means for transporting recovered oil to said storage means.

3. The apparatus as defined in claim 2 wherein said recovery means include means for separating water from recovered oil.

4. The apparatus as defined in claim 2 wherein said storage means comprise a liquid-inflatable, bladder-like enclosure.

5. The apparatus as defined in claim 4 wherein said bladder-like enclosure is made substantially from a rubber or rubber-like material.

6. The apparatus as defined in claim 4 further including fastening means attached to said enclosure for fastening a tow line from the vessel to said enclosure.

7. The apparatus as defined in claim 2 further including means for towing said storage means from the vessel.

8. The apparatus as defined in claim 1 wherein said barrier means comprise a floating boom.

9. The apparatus as defined in claim 8 wherein said recovery means comprise:
   collection means located on the vessel for storing recovered oil;
   a plurality of recovery lines attached to said floating boom which remain submerged in the water substantially near the surface of the water, said recovery lines having openings defined therein;
   a plurality of transporting hoses extending from the vessel and connected to said recovery lines; and
   means for drawing oil floating on the body of water through said recovery lines and transporting hoses into said collection means.

10. The apparatus as defined in claim 9 wherein said collection means include means for separating water from oil.

11. The apparatus as defined in claim 10 further including storage means which float on the water for storing recovered oil at a remote location from the vessel and means for transporting recovered oil to said storage means.

12. The apparatus as defined in claim 9 wherein said drawing means comprise pump means operatively connected to said transporting hoses for creating a suction to draw oil therethrough.

13. The apparatus as defined in claim 9 further including means for preventing solid materials from entering said openings in said recovery lines.

14. The apparatus as defined in claim 9 wherein said drawing means comprise an on-board recovery line connected to each of said transporting hoses; and pump means operatively connected with said on-board recovery line for creating suction power.

15. The apparatus as defined in claim 1 wherein said support booms are mounted to the deck of the vessel for movement between a stored position in which said support booms are above the deck of the vessel and a deployed position in which said support booms extend along the side of the vessel.

16. The apparatus as defined in claim 1 wherein said means for moving and maintaining said barrier means also deploys said recovery means into the body of water.

17. The apparatus as defined in claim 1 wherein said recovery means includes at least one recovery line attached to said barrier means, at least one transporting line extending from the vessel and attached to said recovery line, and means for drawing oil through said recovery line and transporting line back to the vessel.

18. An apparatus for confining and recovering oil and other floatable liquid pollutants discharging into a body of water from an oil-carrying vessel comprising:

barrier means for confining the discharged oil around the vessel;

means for moving and maintaining said barrier means relative to said vessel, said moving and maintaining means comprising a plurality of support booms mounted to the vessel and attached to said barrier means, wherein each of said support booms comprise:

a telescoping portion having one end attached to said barrier means, a support portion having one end mounted to the deck of the vessel and another end pivotly attached to the telescoping portion, said support portion extending downward along the side of the ship in a deployed position, said telescoping member being pivotable between a raised and lowered position relative to said support position, and means for moving said telescoping portion between the raised and lowered position;

means for recovering at least a portion of the discharged oil in the water; and means for storing oil recovered by said recovery means.

19. The apparatus as defined in claim 18 wherein said support portion moves between the deployed position and a stowed position in which the support portion is located above the deck of the vessel.

* * * * *